Dec. 8, 1936.  C. W. VOGT ET AL  2,063,065
APPARATUS FOR PROCESSING MATERIAL
Filed Oct. 15, 1930   2 Sheets-Sheet 1
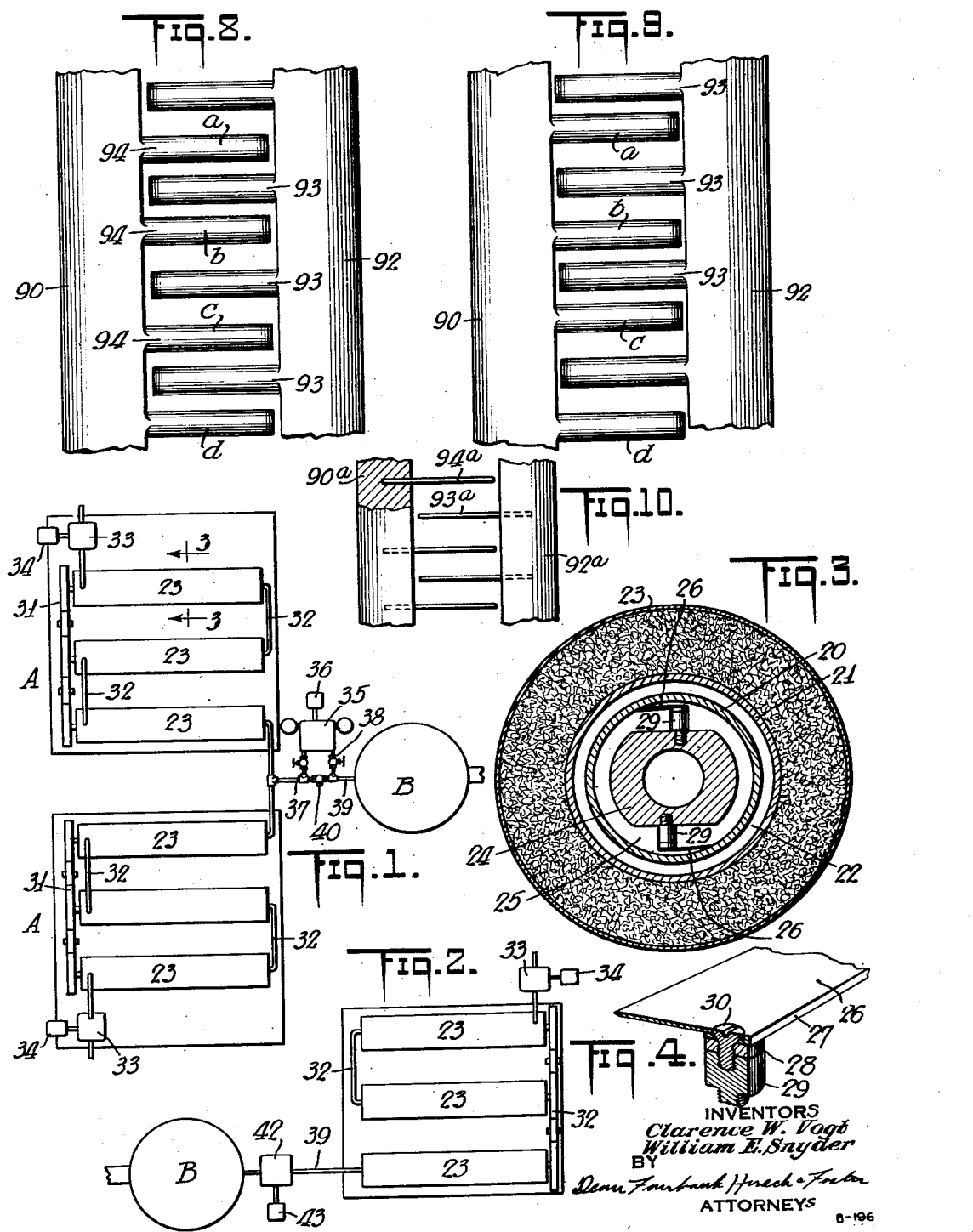
INVENTORS
Clarence W. Vogt
William E. Snyder
BY
ATTORNEYS

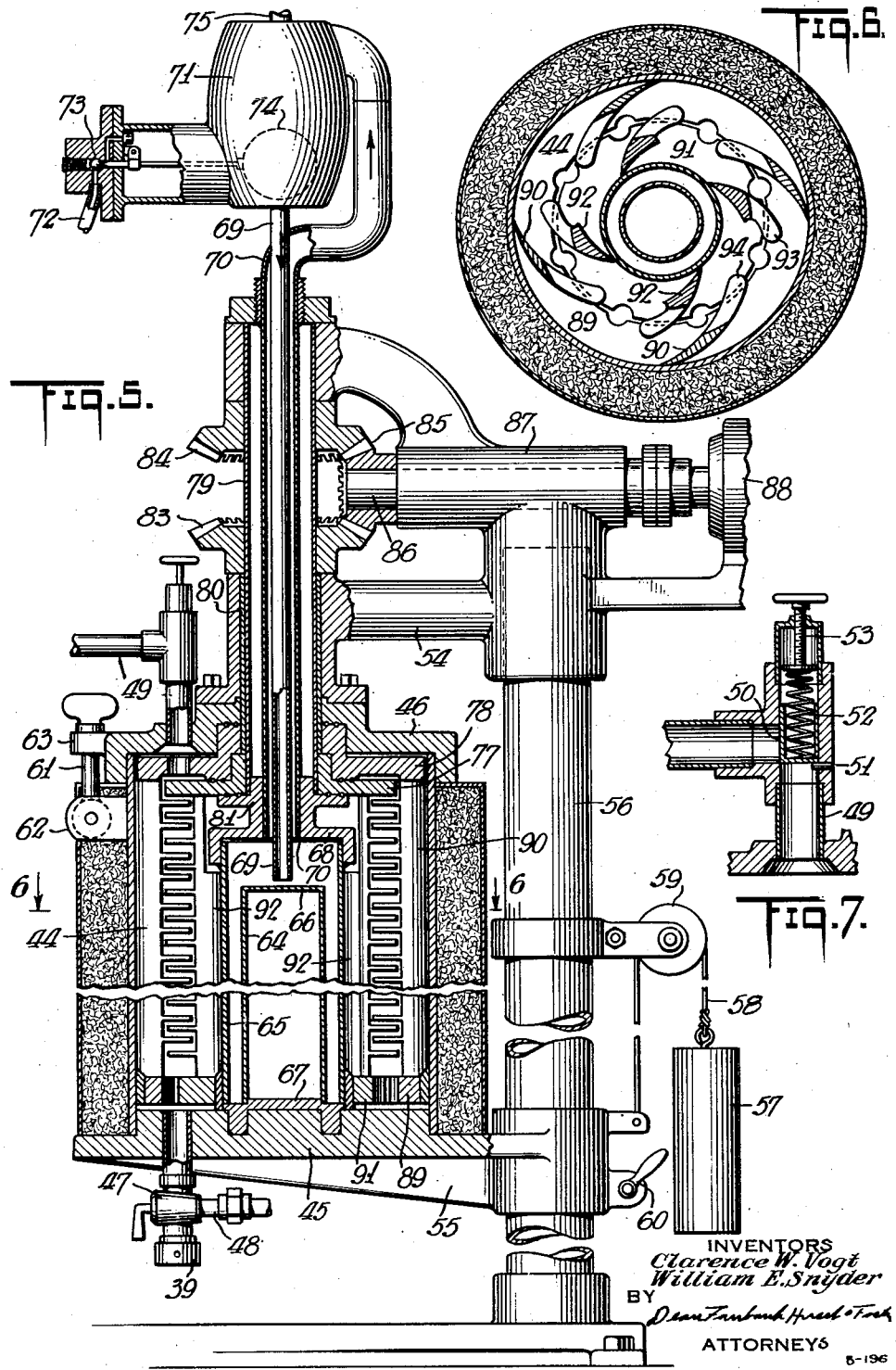

Patented Dec. 8, 1936

2,063,065

UNITED STATES PATENT OFFICE 2,063,065

APPARATUS FOR PROCESSING MATERIAL

Clarence W. Vogt and William E. Snyder, Louisville, Ky., assignors, by mesne assignments, to The Girdler Corporation, Louisville, Ky., a corporation of Delaware Application October 15, 1930, Serial No. 488,808

16 Claims. (Cl. 62—114)

This invention relates to an apparatus for processing liquid or semi-liquid materials of mixtures to increase the stiffness of the material, for instance, by causing the crystallization or solidification of a portion of the ingredients.

In the chilling of vegetable and animal oils where agitation is present during the chilling and where such oils are chilled in an efficient unit similar to those shown in Vogt Patents 1,783,864, 1,783,865 and 1,783,867, dated Dec. 2, 1930, and granted on applications copending herewith, with the temperature of the refrigerant at a point substantially below the temperature of the material under treatment, it is possible to lower the temperature of the material 20° F. to 40° F. below that at which it should be a substantial solid, but because of the rapidity at which the temperature has been lowered together with the effectiveness of the agitation the material is still in a readily flowable state. It has been found under these conditions, however, that as soon as agitation ceases the material will "set" instantly. This "setting" of the material involves the crystallization of a portion of the ingredients. The heat of crystallization, which is given off by this portion, is taken up by the remainder of the material as sensible heat and thus the temperature of the material will be (unless otherwise prevented) appreciably raised during this "setting". This increase in temperature, due to additional crystallization, will hereinafter be referred to as "kick up".

Materials in which an air or gas is incorporated to cause the desirable whiteness and spreading quality in the commercial product known as lard or lard substitutes, and when chilled very rapidly to a degree substantially below a temperature at which it should become substantially solid, and agitated to cause a proper smoothness and uniformity of incorporation of air, exhibit this kick up upon being discharged into a container. This kick up in temperature may cause a loss of some of the air which had been previously incorporated at the lower temperature and produce what is known as a "vaseliney" condition or a translucency as contrasted to the desired whiteness and opaqueness. It has been found that a large percentage of this kick up occurs within the first minute or two after rapid chilling and mechanical agitation ceases.

The present invention involves a new form of apparatus including a unit which will hereinafter be referred to as a "B" unit or units, and which is particularly adapted to be operated in conjunction with another unit which may be similar to those disclosed in said previous patents, and hereinafter referred to as an "A" unit or units. In the case of margarin and vegetable oils such an apparatus should have sufficient capacity for retaining the material which had been previously processed in the A unit, said B unit having sufficient refrigeration to absorb additional heat of crystallization, and having a proper type of whipping and working means to prevent the formation of lumps during this period. Between such B unit and the A unit or A units from which same is supplied, means are provided for the incorporation or addition of air or an inert gas where such addition is considered to be desirable.

In the case of ice cream, such a B unit has the advantage of distributing, and at the same time cooling large or small particles of fruit, etc., which have been added to a product which has been previously processed in one or more A units. Such an apparatus has the further advantage of unifying or standardizing the product which has been previously partially frozen in one or more A units so that the product delivered from the B unit is of a uniform texture. In the apparatus disclosed in said patents a greater degree of uniformity can be obtained than from any apparatus heretofore known in the art, but uniformity is a relative term. As an example, if the material from one A unit is being held between 100 and 105% overrun, and the material from another unit is being held between the same limits, when these two products are passed into a common B unit in which they are further mixed, it will be obvious that the fluctuation of the product coming from the third or B unit will be less than the fluctuation of either of the primary or A units.

In the case of lard or lard substitutes the same advantages apply as in the case of margarin hereinbefore set out except for the fact that the addition of air or other gas has been found essential to obtain the desired opaqueness and as hereinbefore pointed out. The incorporation of relatively cooled gas or air with the chilled product is advantageous over the adding of relatively cool air or gas to the relatively hot oil, thereby permitting the gas to be heated, and therefore requiring the cooling of this gas which is taking up valuable space, and thus reducing the amount of B. t. u. absorbed by a given size A unit.

Although the present improved apparatus will be explained only as including or used with apparatus mentioned in the aforesaid patents, this invention is not limited to the use in connection with such apparatus, but may be used as the sole means for the cooling or chilling of fluids or plastic materials.

In the accompanying drawings one embodiment of the invention is shown for purposes of illustration, but the details are not to be considered as any limitations of the scope of the invention except as defined in the appended claims.

In these drawings:

Fig. 1 is a diagrammatic representation of a plurality of A units connected for delivery to a single B unit, and particularly adapted for ice cream or the like, Fig. 2 is a diagrammatic illustration of another arrangement of A and B units which may be used for processing margarin, lard or lard substitutes, Fig. 3 is a transverse section through one of the A units, for instance, on the line 3—3 of Fig. 1 and on a very much larger scale, Fig. 4 is a detail partly in section and partly in perspective of a blade employed in the A section shown in Fig. 3, Fig. 5 is a central vertical section of a B unit, Fig. 6 is a transverse section on the line 6—6 of Fig. 5, Fig. 7 is a detail of the outlet valve for the processed material, Figs. 8 and 9 are enlarged details showing a preferred arrangement of blades in the B unit, and Fig. 10 is a view similar to Figs. 8 and 9, but showing an alternative arrangement of blades.

As previously indicated the A unit may be constructed substantially as shown in any one of certain prior Vogt patents, and in such unit the material is subjected to the required refrigeration, while advanced as a comparatively thin layer and while beaten, agitated or whipped in said layer.

In Fig. 3 there is illustrated a section through such a unit. The material is caused to flow lengthwise through a tube 20 which is encircled by an outer tube 21 to provide an annular space 22 for the refrigerating medium. This medium may be either brine, ammonia or other fluid and its temperature will be controlled in accordance with the character of the material treated. Outside of the tube 21 is an insulating jacket 23 to prevent heat losses through radiation. Inside of the tube 20 is a shaft 24 of an external diameter nearly as great as the internal diameter of the tube 20 so as to leave a comparatively thin annular space 25 through which the material to be processed is caused to flow. The thickness of this annular space may vary depending upon the character of the material treated, but for ordinary materials, such as ice cream, margarin or the like, the space is preferably not greater than 1/16" in thickness.

The shaft 24 carries one or more whipping, agitating, beating or scraping blades disposed adjacent to the inner surface of the tube 20. The present invention does not reside in the specific character or details of these blades, but an improved form includes a flexible blade 26 formed of thin metal as shown in Fig. 4. The blade is so mounted that one edge lightly presses against the inner surface of the tube 20 and the opposite edge is spaced from the shaft a sufficient distance to permit the material which has been scraped off the refrigerated surface to pass beneath the blade, that is, between the latter and the shaft. The blade at its rear edge is preferably folded back upon itself to form a reinforcement 27, and there are preferably soldered or welded to this rear edge portion a plurality of washers 28 so as to give the blade adequate thickness at the supported point.

The shaft is provided with a plurality of studs 29 which may be threaded into a flattened side of the shaft and screws 30 extend through the blade 26 and washer 28 into said studs. By reason of the washers 28 there is no danger of the screw heads being forced through the thin metal blade, even though the screw heads are countersunk so that the outer surface is flush with the outer surface of the blade.

The single blade 26 may extend the full length of the tube 20 or the blade may be cut into a plurality of sections so that contact with the tube wall is insured along the full length.

Preferably there are employed a plurality of the tubes 20 connected together in series. All of these tubes may be mounted in a single casing and insulating jacket as illustrated in Patent 1,783,865, but to simplify illustration in the present case, we have shown the tubes mounted side by side with the ends of the shafts 24 connected by a train of gears 31 so that the shafts are simultaneously rotated at the proper desired speeds. The tubes are also shown as connected together in series by conduits 32 which in practice are, of course, insulated to prevent heat losses.

This apparatus in which the material is forced at high speed while being subjected to intense refrigeration and violent agitation, is designated as an A unit irrespective of whether the unit contains a single tube 20 or a series of such tubes, and even though the details of the apparatus vary quite materially from that herein illustrated or illustrated in the aforesaid prior patents.

In Fig. 1 we have shown two such units in parallel connected in series with the B unit. Material is delivered to each unit by a pump 33 which may be driven by a suitable motor 34. The pump is a material admission pump and may serve as a combined liquid and gas pump if air or other gas is to be delivered with the material through the A unit. It may also serve as a mixing and proportioning pump if two or more liquids or other fluids are employed, or if solid material is fed in with the liquid or semi-liquid material. A pump of this general character is illustrated in the Vogt Patent 1,902,315 issued March 21, 1933.

The material from one or several A units is delivered to a B unit illustrated diagrammatically in Figs. 1 and 2. Between the A and B units there may be employed a suction pump 35 for drawing the material from the A unit or units and supplying it under pressure to the B unit or for adding a gas or other ingredients, such as fruit or nuts. This pump is preferably of the type illustrated in the Vogt Patent 1,902,346 issued March 21, 1933. The pump is operated by a motor 36 and has valve controlled inlet and outlet conduits 37 and 38 connected to a transfer line 39 between A and B units and upon opposite sides of a valve 40. This valve which is not illustrated in detail may be of any suitable type, but is preferably a combined stop and check valve.

In Fig. 2 there is illustrated only one of the A units for delivery to a single B unit.

In the transfer line 39 there is provided a pump 42 driven by a motor 43. This is the preferred arrangement for margarin or lard or lard substitutes in which the air or other gas is added after the material has left the A unit. The pump 42 is of the type previously referred to and serves for the delivery of air or other gas into the material, as well as serving to pump the material from the A unit to the B. It also serves to properly proportion the refrigerated material and the added gas. Various other arrangements of A and B units may be employed. While not shown, it will be readily understood that either of the pumps 35 or 42 may receive its supply of gas from a gas holder held at a uniform pressure or from any suitable source, for instance, if the air is to be added it may be drawn through filtering and dehumidifying units.

One form of secondary or B unit is illustrated in Figs. 5 and 6. The material is delivered from the A unit through the pipe 39 to a processing chamber 44 which may be of such capacity that the flow of material therethrough will take a very much greater time than is required for the flow of the material through an A unit. The chamber is illustrated as a cylindrical drum having heads 45 and 46 with the inlet at one end and the outlet at the other. Preferably the material enters near the bottom of the drum and escapes at the top. The supply line 39 is illustrated as having a three way valve 47 with a drain pipe 48 so that by proper manipulation of this valve the supply may be shut off and the unit drained. The outlet is shown as a pipe 49 leading from the top head 46 and having an adjustable spring pressed valve 50 which will open when the pressure in the unit reaches a predetermined limit and will thus act to maintain the proper pressure in the B unit. The valve is shown as engaging a stop 51 in closed position and having a spring 52, the tension of which may be adjusted by a regulating screw 53 so that the back pressure in the unit may be readily controlled.

To facilitate cleaning, the parts are formed so as to be readily separable. As illustrated the top head 46 is mounted on a bracket arm 54, while the bottom head 45 is mounted on a bracket arm 55. The two arms are mounted on a standard 56 and at least one of them is made slidable along the standard. As shown it is the lower arm which is slidable and it is counterbalanced by a weight 57 and a flexible supporting member 58 extending over a pulley or drum 59. When the bottom head is raised to the proper closing position it may be clamped by suitable locking screws 60. The peripheral wall of the chamber may be permanently connected to the lower head, while the upper head may be clamped in place by any suitable form of fastening means, as for instance, bolts 61 pivoted in brackets 62 on the peripheral wall and engaging with lugs on the top head.

The B unit, in the form illustrated, is internally refrigerated, although so far as concerns the broad scope of the invention, the refrigerant may be externally applied as is the case with the specific form of A unit illustrated.

In the form illustrated, within the chamber 44 there is a pair of concentric cylindrical walls 64 and 65 spaced apart to leave an annular vessel for the refrigerating medium. The inner wall 64 is closed at both ends by walls 66 and 67 and may form merely a sealed air chamber or may be filled with insulating material. The wall 67 preferably has pins or other means engaging the bottom 45 to resist all tendency of the refrigerant vessel to rotate. The outer wall 65 at its lower end is also connected to the wall 67, but at its upper end has a separate head or top wall 68. Through this wall extend two concentric pipes 69 and 70, one for the admission and the other for the outflow of the refrigerant. The inner pipe 69 is preferably for the supply, and if the refrigerant be a volatile one, such as ammonia, this pipe may lead from a float chamber 71 and the return pipe 70 may lead to the upper part of this chamber. The ammonia may be delivered to the float chamber through a pipe 72 controlled by a spring pressed check valve 73 which may be forced to open position by the lowering of the float 74 below a predetermined level. Thus the refrigerating space between the walls 64 and 65 is kept flooded with the refrigerant, and the latter is evaporated at a rate depending upon the back pressure maintained in the return pipe 75, and upon the heat transfer from the material in chamber 44.

If brine be the refrigerant one of the refrigerant pipes should be extended to the bottom of the refrigerant vessel to insure proper flow in the vessel.

Within the chamber 44 and encircling the refrigerant vessel, there is provided an agitating mechanism which serves to thoroughly mix and homogenize the material being processed. This mechanism also serves to continuously scrape the inner periphery of the chamber as well as the outer surface of the wall 65. The mechanism is so designed that it will permit the processing of material containing comparatively large solid ingredients, such as fruit, nuts, or the like, which are often used in ice creams.

The agitating mechanism as illustrated includes a pair of headers or annular plates 77 and 78 in superposed position at the top of the chamber and just beneath the stationary top wall or casing head 46. One of these annular members is rotated in one direction and the other in the opposite direction.

As illustrated, there are provided two hollow concentric shafts 79 and 80 encircling the refrigerant return pipe 70. Both of these are sealed at their inner ends, the shaft 79 being secured to the annular blade carrier or header 77 and the outer shaft being secured to the upper annular blade carrier or header 78. The top wall 68 of the refrigerant chamber preferably has an extension 81 projecting into the lower inner end of the inner shaft 79 to guide the latter and to provide a seal for the inner end of this shaft.

The juxtaposed surfaces of the parts 81, 77, 78 and 46 may be provided with sealing grooves to prevent the passage of material therebetween, and if desired with roller bearings.

The inner hollow shaft 79 extends above the upper end of the outer shaft 80 and the two shafts are provided with suitable means for rotating them in opposite directions. As illustrated the shafts have opposed miter gears 83 and 84 meshing with a pinion 85 at opposite points. This pinion is mounted on a shaft 86 which is journaled in a bearing 87 mounted upon the upper end of the upright or standard 56. The standard may also serve to support an electric motor 88 for driving the shaft at the desired speed.

As previously noted the annular plates 77 and 78 serve as blade carriers. The upper annular plate 78 is connected to a ring 89 adjacent to the bottom of blades 90 which are mounted to closely engage or scrape the inner surface of the outer wall of the chamber 44. The lower plate 77 is connected to a ring 91 concentric with the ring 89, by means of a series of blades 92 closely juxtaposed to or scraping upon the outer surface of the wall 65. The blades face in opposite directions as illustrated in Fig. 6 so that they operate properly when rotated in opposite directions. The outer blades 90 tend to throw the material in toward the center, while the inner blades 92 serve to force it outwardly. Thus the material is thoroughly intermixed and homogenized.

For insuring the proper intermixing the blades have a series of fingers, prongs or projections in staggered or intermeshing relationship so that the prongs of one blade pass through between the prongs of the other blade and have a cutting or wiping action, and at the same time so that solid pieces of fruit, nuts or the like may pass therethrough.

In Figs. 8 and 9 we have illustrated a somewhat diagrammatic development of the blades and their projections. The inner blades 92 are provided with outwardly extending projections or fingers 93 and the outer blades are provided with inwardly extending projections or fingers 94. On all of the inner blades the projections are spaced at uniform distances apart as shown in Figs. 8 and 9 and the fingers of one inner blade are in the same transverse plane as the fingers of each of the other blades. The outer blades 90 have their projections or fingers 94 somewhat differently spaced. On each alternate outer blade 90 the projections are designated on Fig. 8 as $a, b, c, d$ etc., and it will be seen that the distance between the projections $a$ and $b$ is the same as it is between $c$ and $d$, but is materially less than it is between the projections $b$ and $c$. Thus the projections $a$ and $b$ come comparatively close to the opposite sides of a projection 93 of the inner blade, but the projections $b$ and $c$ are spaced to a greater distance from the projection 93 which passes therebetween.

On the blades 90 as shown in Fig. 9 the spaces between the projections $a$ and $b$ and also between $c$ and $d$ are wider, while the spaces between projections $b$ and $c$ are narrower.

Thus each projection 93 passes alternately through a narrow space and a wide space of the projections on the outer blades 90 and the material is more closely cut or wiped in going through a narrow space than it is while going through a wider one, but the wider ones permit the passage therethrough of the large solid particles.

The interconnection of the projections tends to give a certain up and down movement of the material which facilitates the blending and homogenizing. The specific spacing of the projections on the blades is not of uniform importance as the spacing may be varied in accordance with the character of the material being treated.

In Fig. 10 there is illustrated somewhat diagrammatically blades 90a and 92a having very narrow projections or fingers 93a and 94a. These may have the character of spacing illustrated in Figs. 8 and 9, or they may be uniformly spaced. Instead of being cast or formed integral with the blades they may be mounted in holes in the blades as illustrated in Fig. 10.

The projections instead of being rigidly mounted on the blades may be hinged thereto or may be flexible so that they may give rather than break in passing through the interdental spaces on the other blades. The blades themselves may have the projections rigid therewith, but may be pivotally or yieldingly connected to the upper and lower members 77, 78, 89 and 91 to permit them to move should they encounter solid pieces of fruit or nuts which could not otherwise readily pass through.

In the apparatus it will be noted that the bottom 45 and the peripheral wall of the chamber may be lowered without disturbing the connections for the refrigerant fluid, and that when lowered the agitators and refrigerant vessel are left suspended so that they are exposed and readily cleanable. The lowered chamber has none of the operating parts therein so that it may be readily cleaned.

As previously noted the B unit may take the product from a plurality of A units and may be of such capacity that the movement through the B unit will be very much slower than through the A unit. During this movement through the B unit the material is thoroughly agitated and mulled while at the same time kept at a low temperature to prevent the kick up or rise in temperature which results from the crystallization following the rapid superchilling in the A unit.

As indicated in Fig. 1 the nuts, fruit or air may be introduced between A and B units so that the B unit mixes these in without the necessity for passing them through the A unit, and the refrigerant in the B unit prevents any rise in temperature from the addition of these warmer ingredients.

By means of the improved process and apparatus hereinabove described, the uniformity of the product may be kept within extremely narrow limits, a smooth texture is maintained during further crystallization, additional ingredients of gaseous or solid form may be incorporated after the initial chilling or partial freezing, and when the material has sufficient body or stiffness to retain the added ingredients distributed throughout the mass.

The material may flow at a rapid rate and in a thin layer in the A unit and at a much slower rate in a thicker layer in the B unit.

Various other advantages will be apparent from a consideration of the specific constructions illustrated, as well as from a commercial operation of them.

In the use of our invention for the processing of materials in which it is desirable that the product be sealed from exposure to atmospheric air, the pipe 49 may be connected to a filling device which extends to the bottom of the packing or packaging unit or container and which will follow the level in the unit or container as said level rises or otherwise varies. The unit or container may be initially filled with an inert gas or be disposed in a chamber filled with such gas.

Having thus described our invention, what we claim as new and desire to secure by Letters Patent is:

1. An apparatus for treating material to change the condition thereof, including a pair of walls spaced apart to form a passage therebetween, means for refrigerating one of said walls, a pair of separate scrapers in said passage, one engaging one of said walls and the other engaging the other, and means for causing a continuous stream of material to flow through said passage.

2. An apparatus for treating material to change the condition thereof, including a pair of walls spaced apart to form a passage therebetween, a pair of separate scrapers in said passage, one engaging one of said walls and the other engaging the other, and means for chilling one of said walls.

3. An apparatus for treating material to change the condition thereof, including a pair of concentric walls spaced apart to form a passage therebetween, a pair of separate scrapers in said passage, one engaging one of said walls and the other engaging the other, and means for chilling the inner of said walls.

4. An apparatus for treating material to change the condition thereof, including a pair of concentric parallel walls spaced apart to form an annular space therebetween, means for refrigerating one of said walls, a pair of separate scraper blades extending lengthwise of said space, one of said blades engaging one of said walls and the other engaging the other wall, means for moving said blades in opposite directions, and mixing projections extending from both of said scrapers into said annular space.

5. An apparatus for treating material to change the condition thereof, including a pair of concentric parallel walls spaced apart to form an annular space therebetween, means for refrigerating one of said walls, a pair of separate scraper blades extending lengthwise of said space, one of said blades engaging one of said walls and the other engaging the other wall, means for moving said blades in opposite directions, and mixing projections extending from both of said scrapers into said annular space, the projections of one of said scrapers intermeshing with those of the other to effect mixing between the scrapers.

6. An apparatus for treating material to change the condition thereof, including parallel walls spaced apart to form an annular passage therebetween, means for refrigerating one of said walls, an annular series of scrapers engaging one of said walls, and a plurality of projections movable with said scrapers and extending into said passage, the projections on one of said scrapers being differently spaced from those on another of said scrapers.

7. An apparatus for treating material to change the condition thereof, including a pair of concentric walls spaced apart to form an annular passage therebetween, means for refrigerating one of said walls, agitating means including a plurality of blades movable in succession along one of said walls, agitating means including a plurality of blades movable in succession along the other of said walls, each of said agitating means having projections extending into said passage, the projections of one agitating means intermeshing with those of the other.

8. An apparatus for treating material to change the condition thereof, including a chamber adapted to receive the material to be treated, a vessel disposed therein and adapted to receive a refrigerating material, said chamber and said vessel having concentric spaced walls, and separate scraper blades, one of said blades engaging the walls of said chamber and another engaging the wall of said vessel.

9. An apparatus for treating material to change the condition thereof, including a chamber adapted to receive the material to be treated, a vessel disposed therein and adapted to contain a refrigerating medium and forming therewith an annular space, an agitating member within said space, a hollow shaft for rotating said agitating member, and a conduit extending through said shaft for delivering refrigerant to said vessel.

10. An apparatus for treating material to change the condition thereof, including a chamber adapted to receive the material to be treated, said chamber including a stationary top wall, a vertically movable bottom wall, a peripheral wall carried by said bottom wall, an agitating member carried by and depending from said top wall, and a refrigerant vessel disposed within said chamber and carried by said top wall, whereby the bottom and peripheral walls may be lowered, leaving said agitating member and said vessel in position.

11. An apparatus for treating material to change the condition thereof, including a vertical standard, a chamber having a top wall rigidly supported thereby, a peripheral wall and a bottom wall vertically movable along said standard, an agitating member within said chamber, means carried by said standard and projecting through said top wall for operating said agitating member, and means for refrigerating the material in said chamber.

12. An apparatus for treating material to change the condition thereof, including a vertical standard, a chamber having a top wall rigidly supported thereby, a peripheral wall and a bottom wall vertically movable along said standard, an agitating member within said chamber, means carried by said standard and projecting through said top wall for operating said agitating member, a refrigerant vessel within said chamber, and means projecting through said top wall for delivering refrigerant to and from said vessel.

13. An apparatus for treating material to change the condition thereof, including a vertical standard, a chamber having a top wall rigidly supported thereby, a peripheral wall and a bottom wall vertically movable along said standard, an agitating member within said chamber, means carried by said standard and projecting through said top wall for operating said agitating member, means for causing the material to flow continuously through said chamber, and means for refrigerating the material in said chamber.

14. An apparatus for treating material to change the condition thereof, including a pair of concentric parallel walls spaced apart to form an annular passage therebetween, means for refrigerating one of said walls, a pair of separate scrapers in said passage, one engaging one of said walls, and the other engaging the other wall, and means for rotating said scrapers in opposite directions.

15. An apparatus for treating material to change the condition thereof, including a pair of concentric parallel walls spaced apart to form an annular passage therebetween, means for refrigerating one of said walls, an annular series of fingers in said passage, a second annular series of fingers disposed in said passage within said first annular series, the fingers of one series intermeshing with those of the other, and means for moving the two series of fingers in opposite directions.

16. An apparatus for treating material to change the condition thereof, including a standard, a chamber for said material having a peripheral wall and a pair of end walls, one of said end walls being rigidly supported on said standard and the other end wall being movable along said standard, an agitating member within said chamber, and means for refrigerating the material in said chamber.

CLARENCE W. VOGT.
WILLIAM E. SNYDER.